(12) United States Patent
Minot

(10) Patent No.: US 7,152,868 B1
(45) Date of Patent: Dec. 26, 2006

(54) VEHICLE WITH VARIABLE GUIDED PENDULAR MOTION

(76) Inventor: Jean-Philippe Minot, 33, route du Crêt des Vignes, 74290 Veyrier du Lac (FR)

( * ) Notice: Subject to any disclaimer, the term of this patent is extended or adjusted under 35 U.S.C. 154(b) by 0 days.

(21) Appl. No.: 09/958,973

(22) PCT Filed: Apr. 7, 2000

(86) PCT No.: PCT/FR00/00903

§ 371 (c)(1),
(2), (4) Date: Mar. 4, 2002

(87) PCT Pub. No.: WO00/61423

PCT Pub. Date: Oct. 19, 2000

(30) Foreign Application Priority Data

Apr. 14, 1999 (FR) .................................. 99 04849

(51) Int. Cl.
*B62K 17/00* (2006.01)
(52) U.S. Cl. ............... 280/267; 280/86.75; 280/86.751
(58) Field of Classification Search ................ 280/771, 280/263, 267, 62, 249, 86.75, 86.751
See application file for complete search history.

(56) References Cited

U.S. PATENT DOCUMENTS

| | | | | |
|---|---|---|---|---|
| 1,350,285 A | * | 8/1920 | Weigel | 74/599 |
| 1,575,618 A | * | 3/1926 | Burlingame | 280/7.17 |
| 1,614,086 A | * | 1/1927 | Schaper | 280/228 |
| 2,928,682 A | * | 3/1960 | Spencer et al. | 280/202 |
| 2,983,522 A | * | 5/1961 | Kirk | 280/267 |
| 3,561,778 A | * | 2/1971 | La Brie | 280/7.14 |
| 3,920,263 A | * | 11/1975 | Bundschuh | 280/236 |
| 3,937,486 A | * | 2/1976 | Weiters | 280/771 |
| 4,020,914 A | * | 5/1977 | Trautwein | 180/210 |
| 4,071,261 A | * | 1/1978 | Winchell | 280/220 |
| 4,132,435 A | * | 1/1979 | Wilson | 280/266 |
| 4,228,750 A | * | 10/1980 | Smith et al. | 114/39.24 |
| 4,281,844 A | * | 8/1981 | Jackman et al. | 280/87.01 |
| 4,723,785 A | * | 2/1988 | Kawaguchi et al. | 280/275 |
| 4,993,733 A | | 2/1991 | Eilers | 280/261 |
| 6,263,990 B1 | * | 7/2001 | Liu | 180/65.1 |
| 6,276,480 B1 | * | 8/2001 | Aregger | 180/213 |
| 6,367,824 B1 | * | 4/2002 | Hayashi | 280/62 |

FOREIGN PATENT DOCUMENTS

FR 2752213 2/1998

* cited by examiner

*Primary Examiner*—Paul N. Dickson
*Assistant Examiner*—Toan C. To
(74) *Attorney, Agent, or Firm*—Fay, Sharpe, Fagan, Minnich & McKee, LLP

(57) ABSTRACT

A vehicle (1) includes a chassis (2) which has a steering assembly (3) at one end and at least one wheel at the other end. The steering assembly includes a pair of steering wheels (4a, 4b) and an interconnecting steering carriage (4) for turning the wheels about a steering or turning axis (ZZ'). An extensible cylinder (6) is connected between the chassis and the steering linkage for rotating it about a transverse axis (YY') which, in turn, inclines the steering axis (ZZ'). Preferably, the extensible cylinder is controlled in accordance with the speed of the vehicle.

8 Claims, 5 Drawing Sheets

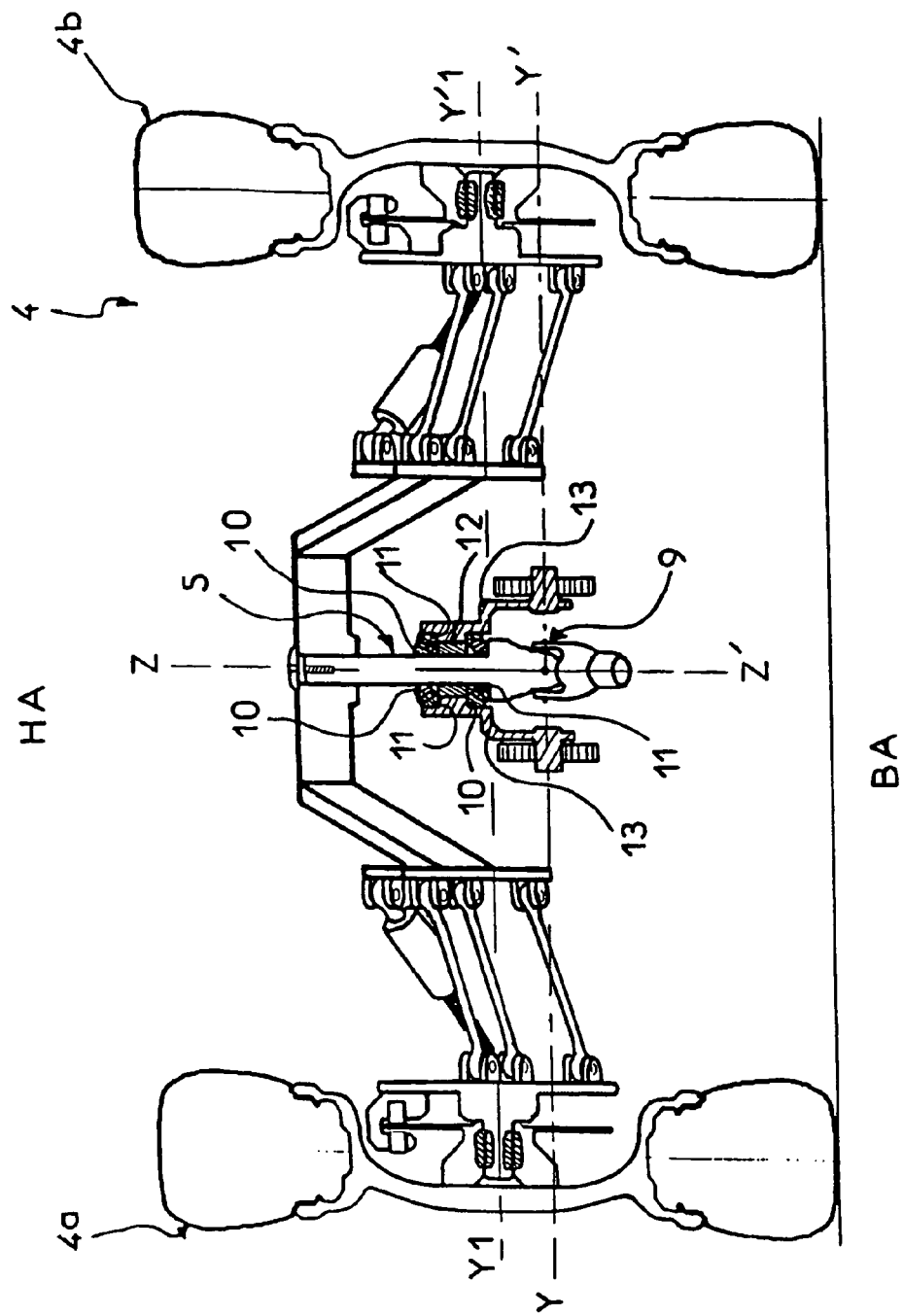

VEHICLE WITH VARIABLE GUIDED PENDULAR MOTION

The present invention relates to an improvement for wheeled vehicles such as tricycles or cars for example. It particularly relates to the connection between the frame of the vehicle and its steering assembly.

The traditional four-wheel vehicle was in the beginning the truck. The ranges and the specific needs of the users have led to the development of a large variety of specialized vehicles. Thus, wheeled vehicles developed by the industrialists, such as the cars, are generally built specifically for the use that the owner will use it for; some being adapted for downtown control and exhibit great handling, while others are adapted for road control and present remarkable behaviors at high speed. Others still are intended for control in the off road or sporting control. At the same time, the market for two wheel vehicles did not know the same functional diversification and was confined to the leisure market.

The manufacturers concentrated volumes on vehicles with four wheels. However, dynamic constraints prevented them until now from developing narrow vehicles, under conditions in conformity with comfort, ergonomics, and safety requirements.

In the same way, the traditional vehicles are generally of very specific design and are adapted to a specific use. Also, these vehicles present some inconveniences dependent on their lack of versatility and with their maladjustment to the different styles of driving and the different conditions of use. The narrow vehicles generally suffer from a bad handling or a poor handling in certain ranges, speeds and cornering.

Certain manufacturers or inventors tried to cure these problems and designed vehicles of particular design such as for example those described in the patents EP 0606191 and FR 96 10290. However, in spite of the good behavior of these vehicles, they are not yet sufficiently adapted to the present needs.

SUMMARY OF THE INVENTION

The present invention aims to solve the above mentioned disadvantages using simple, reliable, economic, adaptable and not very expensive means. It allows the creation of light, handy and general-purpose vehicles, which can be adapted to all the types of control.

Thus, according to its principle characteristics, the vehicle of the invention is of the type comprising a chassis on which a steering assembly is articulated for rotation around a steering axis or an axis of rotation. The assembly includes at least two steered wheels, and is characterized in that it comprises an inclining means for inclining the axis of rotation.

According to the preferred mode of the vehicle of the invention, the axis of rotation is formed by a pivoting element or shaft interdependent with the steering assembly and the inclining means includes an articulation which allows turning the pivoting shaft around a transverse axis.

According to another characteristic of the vehicle of the invention, the inclining means allows inclining the slope of the axis of rotation from vertical forwards if the steering assembly is in the front and from vertical backwards, if the steering assembly is in the back.

According to a complementary characteristic of the vehicle of the invention, a slope or inclining means allows adjusting the inclination of the slope of the axis of rotation while the vehicle is moving.

According to a complementary characteristic of the vehicle of the invention, the axis of rotation is defined by a pivoting shaft integral with the steering assembly and in which the inclining means comprises a return bearing in which the pivoting shaft pivots, the aforementioned bearing being carried by a control arm (control means) articulated in rotation on the chassis around the axis of transverse rotation.

According to another characteristic of the vehicle of the invention, a steering means controls in rotation a steering column which is articulated on the pivoting shaft to transmit steering rotation relative to the chassis.

According to the mode of realization of the vehicle, the inclining means comprises a control means that allows control of the slope of the axis of rotation.

According to the preferred mode of realization of the vehicle of the invention, the control means include a fluid cylinder positioned between the frame and the control arm or its return bearing.

According to a complementary characteristic of the vehicle of the invention, the control means comprising means for determining the optimum angle of inclination of the axis of rotation according to the characteristics of the vehicle and/or of its environment.

According to the preferred mode of realization of the vehicle of the invention, the angle of inclination of the axis of rotation compared to the vertical is determined according to the speed of the vehicle, the angle of inclination increasing when the speed of the vehicle increases.

Some other characteristics and advantages of the invention will emerge from the description which follows and the annexed drawings which are given only by way 6f nonrestrictive examples.

BRIEF DESCRIPTION OF THE DRAWINGS

The FIGS. 1 through 5 illustrate the preferred mode of realization of the vehicle of the invention and one of its alternate embodiments.

FIG. 5 illustrates a similar view to FIG. 2 of an alternative embodiment of the vehicle of the invention.

DETAILED DESCRIPTION OF THE PREFERRED EMBODIMENTS

Figure 1:
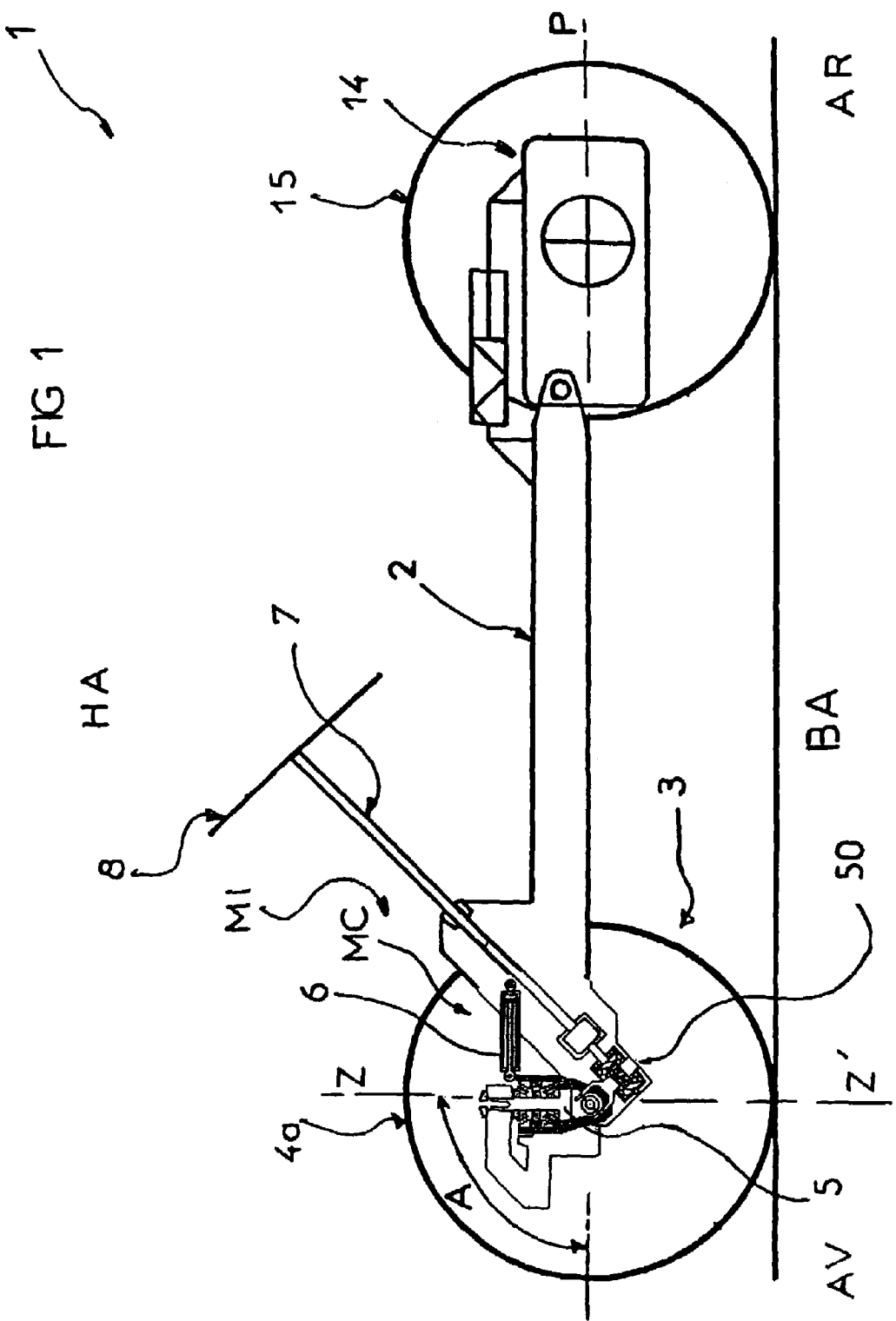
FIG. 1 illustrates in side view the vehicle and its pivoting shaft in a substantially vertical orientation.
Figure 3:
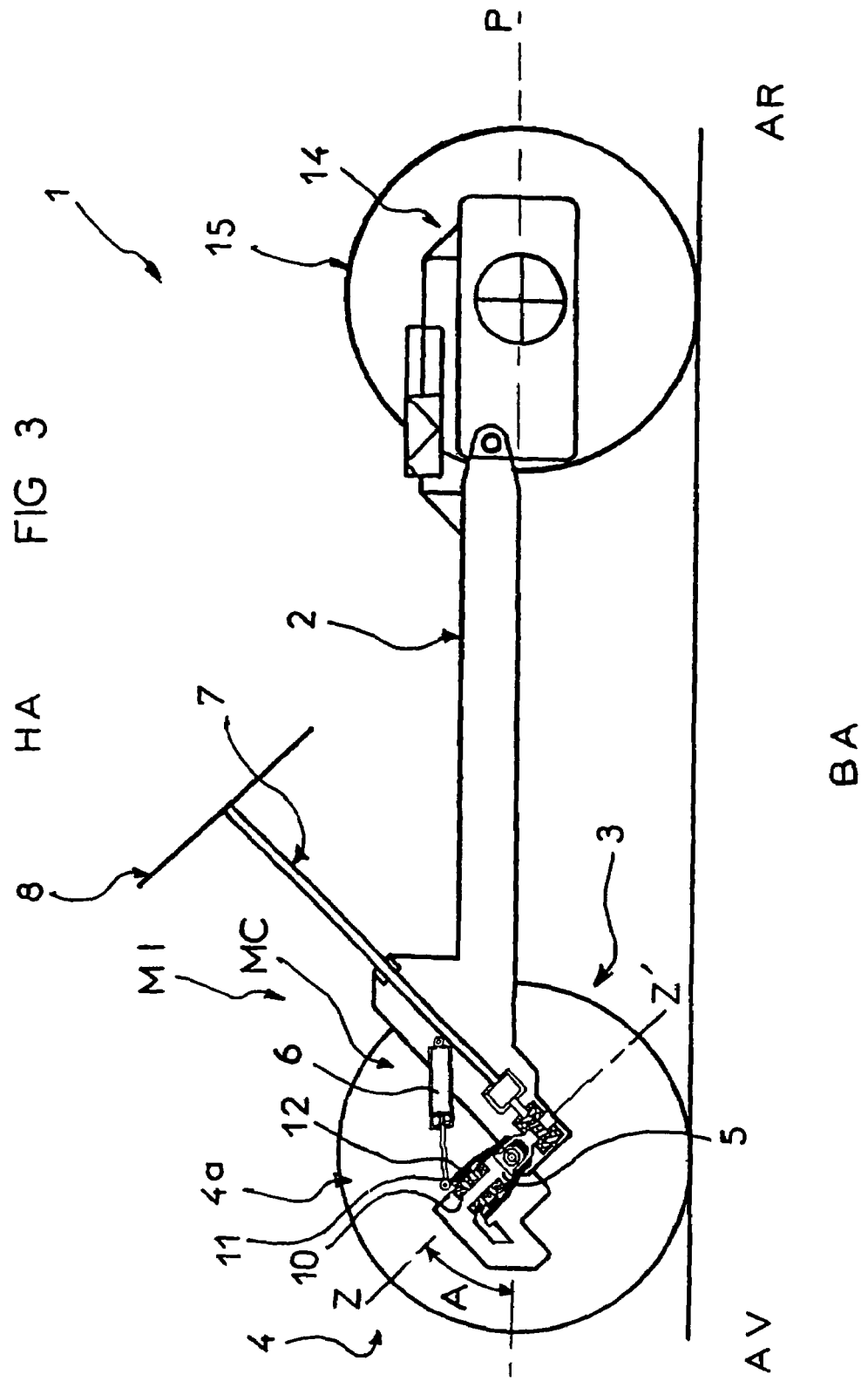
FIG. 3 represents a similar view as FIG. 1 of the vehicle and its pivoting shaft in an appreciably inclined position.

According to the invention, the vehicle carrying the general reference 1 is a vehicle of the wheeled type. It comprises a chassis frame 2 articulated around an axis of rotation ZZ' on a steering assembly 3 which has at least two steering or guarding wheels 4a, 4b. Note that the steering assembly can advantageously be mounted at the front of the vehicle 1, as shown in FIGS. 1 and 3. However, it could be different and the steering assembly could be mounted at the back, without diverting from the present invention.

In the same way, according to an alternative embodiment not illustrated, the vehicle could present two complementary sets of steering assemblies, one at the front, and the other at the back, with both sets being intended to cooperate together to direct the vehicle.

Figure 2:
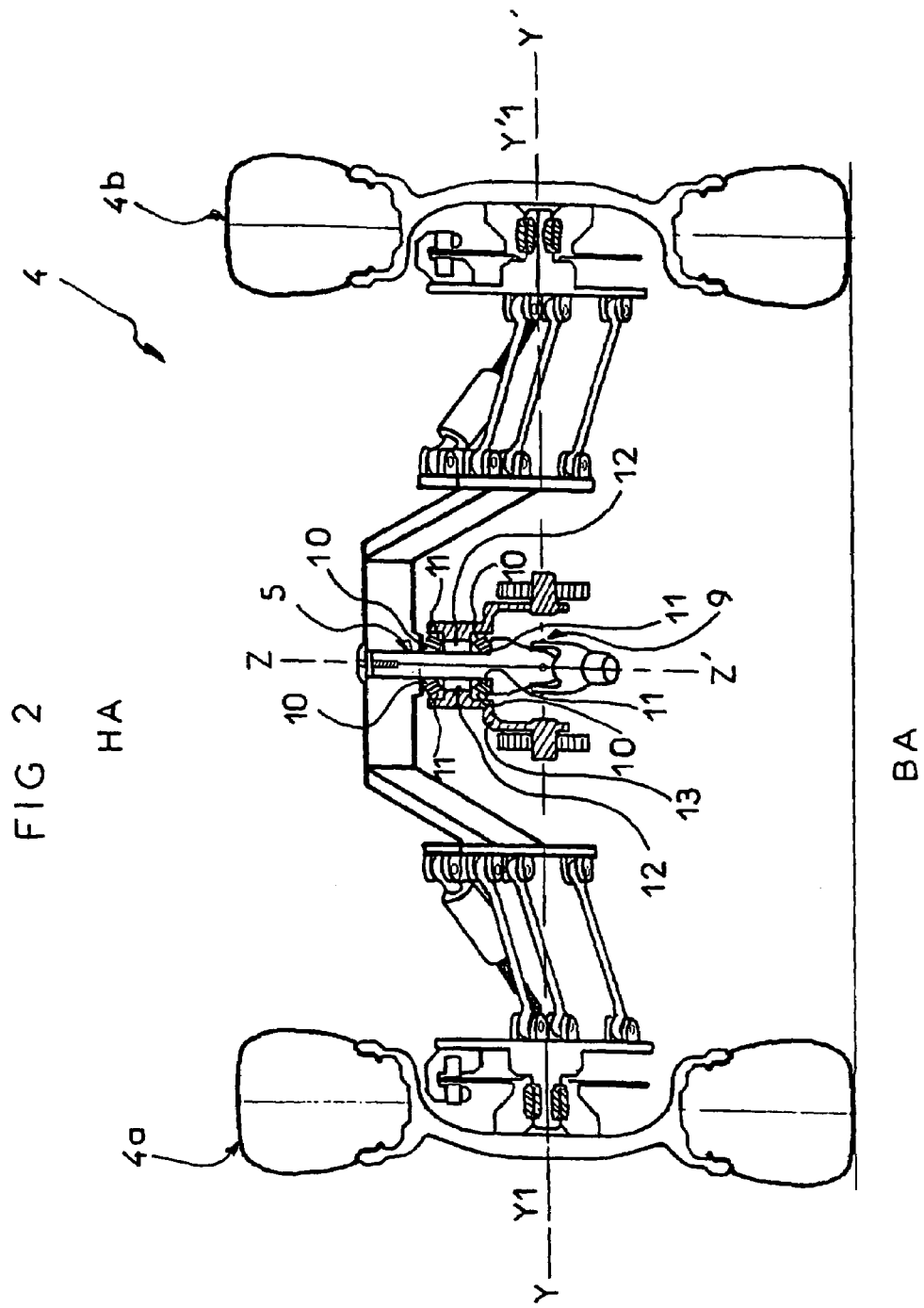
FIG. 2 represents a transverse section of the vehicle and its pivoting shaft in a substantially vertical orientation.
Figure 4:
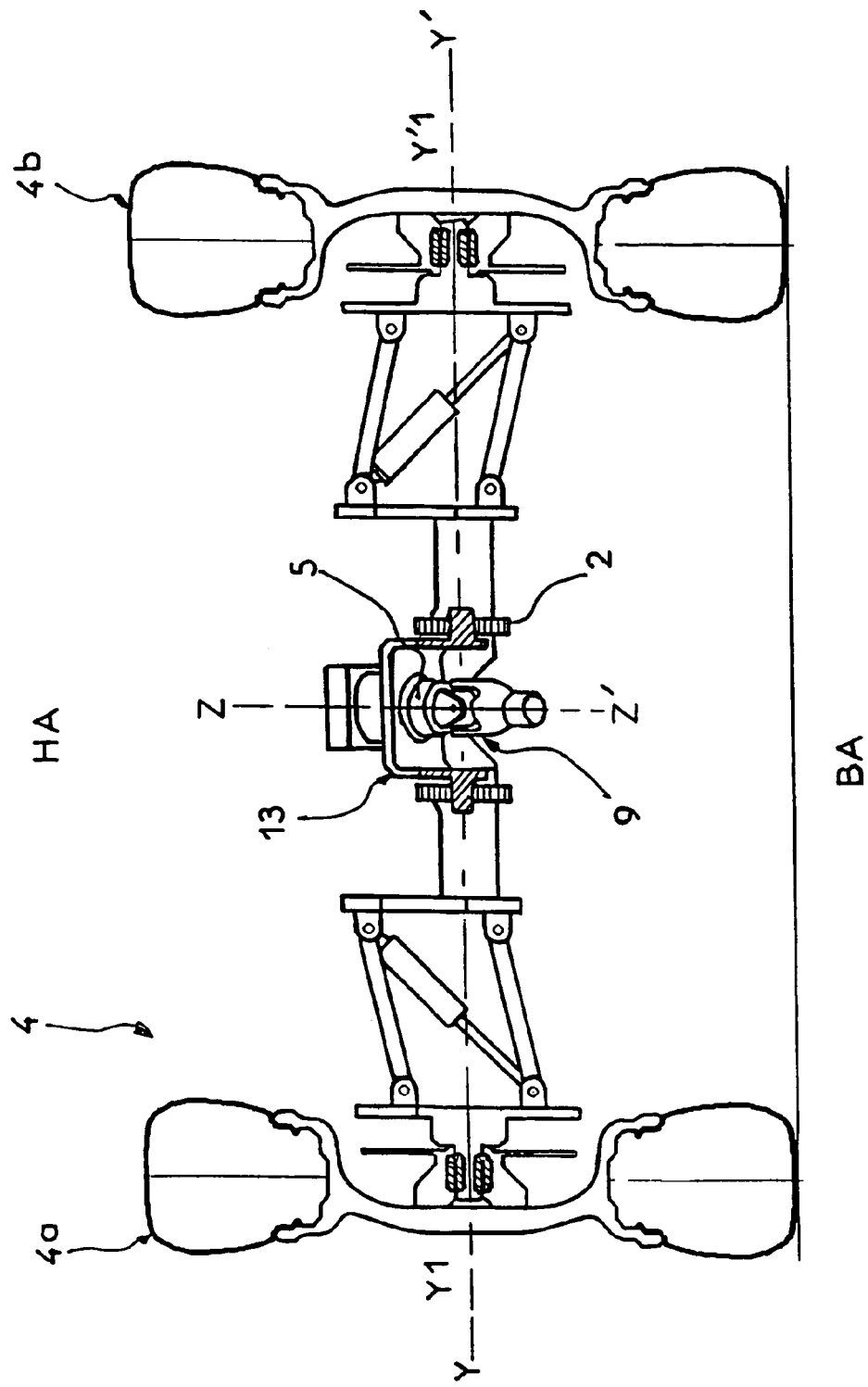
FIG. 4 represents a similar view to FIG. 2 with the vehicle and pivoting shaft in an appreciably inclined position.

According to the preferred embodiment illustrated in FIGS. 1 through 4, the steering assembly is shown at the front AV of the vehicle 1. It comprises two guiding or turning wheels 4a, 4b mounted on the steering carriage 4 to pivot relative to the frame around the steering axis or axis of rotation ZZ', as shown in FIGS. 2 and 4. The vehicle comprises an inclining means MI intended to allow inclination of the axis of rotation ZZ' around which the whole steering assembly pivots relative to the frame. The inclining means are advantageously controlled by means of a command or control means MC which controls the slope of the steering axis ZZ', i.e., the angle A that the steering axis ZZ' presents relative to vertical.

According to the preferred embodiment, the steering axis ZZ' between the frame 2 and the steering carriage 4 and the overall steering assembly 3 is defined by a pivoting shaft 5. The pivoting shaft can present an angle of inclination A in the range of 0 and 90°, i.e., between an inactive or neutral position illustrated in FIG. 1 in which the pivoting shaft is vertical and an extreme position (not illustrated) where the fork presents a slope or angle of inclination A appreciably equal to 90° and is thus in a horizontal plane parallel to the ground. However, according to the preferred mode of realization, the angle of slope varies preferentially in the range between 0 and 45°.

According to the invention, the control means MC comprise of means for determining the optimum angle of slope or angle of inclination A of the pivoting shaft 5 as a function of the functional characteristics of the vehicle and at its conditions of use. This confers to the vehicle a pleasant and manuverable behavior as well as a good handling whatever its conditions of use.

According to the illustrated embodiment, the pivoting shaft 5 of the front steering assembly 3 inclines upward and forwards. In the case of a rear steering assembly, the pivoting shaft 5 would be directed conversely to the top HA and rear AR. The inclining means MI includes a control means MC, such as a fluid cylinder 6 for moving the pivoting shaft 5 in the general symmetry plane P of the chassis 2 around a transverse axis of rotation YY' toward the top and forwards. Accordingly to the preferred embodiment of the vehicle of the invention, this axis of rotation YY' transverse of the pivoting shaft 5 is disposed appreciably along the rotational axis of the wheels or front axle Y1 Y'1 of the steering carriage.

According to the first embodiment of the vehicle of the invention, a steering column 7 is integral with a steering unit or means 8, for example, a wheel or a handlebar, and transmits steering motion to the pivoting shaft and thus to the steering carriage 4. The pivoting shaft 5 is connected to the steering column 7 by a transmission and bevel gearbox comprising a universal joint to allow the transmission of the movement from the steering column to the pivoting shaft whatever the slope of the pivoting shaft 5. The transmission device and bevel gearbox is in a known way an endless screw or worm gear 50. Thus, the articulation or linkage 9 allows inclining the slope of the pivoting shaft S by an angle A relative to the plane of the frame 2 due to the movement of rotation of the pivoting shaft 5 around the transverse axis YY' and constitutes thus partly the inclining means MI of the pivoting shaft 5.

According to the first embodiment the transmission of the rotary coupling between the steering column 7 of the frame 2 and the steering carriage 4 is interdependent from the pivoting shaft 5 implemented via the articulation and an endless screw or worm gear controlled by the steering column 7. The pivoting shaft 5, as advantageously shown, is free to rotate in a return bearing 12 carried by a command or control arm 13. The return bearing 12 is rotatably connected with the chassis 2 for rotation around the axis of transverse rotation YY' to allow its inclination and therefore the slope of the pivoting shaft 5 to be adjusted.

The return bearing 12 and its control arm 13 as well as the articulation 9 forms in part the inclining means MI that allow the pivoting shaft 5 to incline in the plane of the frame towards the front AV under the control of the control means MC.

The control means MC comprises one or more fluid cylinders to actuate the inclining means MI. The cylinders 6 are disposed between the chassis 2 and the control arm 13 or the return bearing 12. They thus cause the rotation around the transverse axis YY' of the return bearing 12 compared to the chassis 2 when they are actuated, and thus the rotation of the pivoting shaft 5 around the articulation 9. The cylinders can be several types, for example, electric, pneumatic, or hydraulic. However, it is important to note that the cylinders 6 must allow with the changes of the angle of slope A of the pivoting shaft 5 to be carried out quickly and in a very precise way. Moreover, the cylinders 6 must be positionable in any position between its two extreme positions, thus the inclining means allow a continuous adjustment of the inclination angle A of the pivoting shaft 5.

In addition, it can be envisaged a safety device, not illustrated, intended to limit the speed of the vehicle in the event of operating fault of the cylinder. This device can operate directly on the accelerator in order to limit its speed and thus constitutes a speed governor which is implemented at the time of a failure of the cylinder.

According to the invention, the inclination angle A varies with the speed of the vehicle so as to increase with speed and conversely. Thus, at low speed, the angle is small, even none, and the swiveling of the steering carriage relative to the chassis 2 is carried out in an appreciably horizontal plane and parallel to the ground, as shown in FIGS. 1 and 2. At raised speed, the inclination angle increases and the relative pivoting of the steering carriage and the chassis is carried out in a plane inclined compared to the ground, such as illustrated in FIGS. 3 and 4, causing the frame to incline towards the interior of the turn against the centrifugal force when the user initiates a direction change using the steering unit 8.

It goes without saying other factors dependent on the vehicle or its conditions of use could be taken into account for calculation of the inclination angle such as acceleration, the weight or the load of vehicle or the stiffness of its shock absorbers, for example, without coming out of the field of the present inventions. These factors could be taken into account to refine the calculation of the inclination angle A. However, their importance must remain small compared to the principal factor which allows the determination of the angle of inclination A based on the speed of the vehicle.

The means which controls the angle of inclination A can be any type of mechanism. For example, they can advantageously comprise means of calculation and programming of the data-processing type in order to allow various parameters to be taken into account for the determination of the optimum angle. These means of data-processing and calculation can thus be programmed to make it possible for the user to choose the operating mode of its vehicle between various canned modes such as an active mode or a traditional mode where the action of the tipping or inclining device more or less is attenuated or decreased compared to the active mode, for example.

According to a second embodiment illustrated in FIG. 5, the transverse axis of rotation YY' around which the pivoting shaft 5 is inclined is aligned or offset with the axis of rotation Y1 Y' of the wheels 4a, 4b of the carriage 4 but is shifted. It can advantageously be disposed below the axis of rotation of the wheels. Thus, at the time of turning of the pivoting shaft around the axis of rotation the chassis undergoes respectively a displacement compared to the steering carriage.

According to the embodiment of FIGS. 1 to 5, the vehicle is provided with a drive motor, advantageously an engine of between 250 cm$^3$ and 500 cm$^3$. However, it can be different and the engine used can develop power more or lower or be of another type such as an electric motor without leaving the field of protection of the present invention.

According to the embodiment of FIGS. 1 to 5, the vehicle 1 is a three-wheeled vehicle or tricycle comprising an aft driving wheel 15 and a front steering carriage 4 with two steering or guiding wheels 4a, 4b. It goes without saying one could imagine a similar vehicle having at the back a rear wheel-axle unit with at least two propelling wheels and comprising an identical inclination device as the front steering assembly. According to this alternative of execution, the chassis is then assembled on the rear wheel-axle unit so as to be able to pivot around a longitudinal axis laid out appreciably horizontally to make it possible for the chassis to incline towards the interior of the turn against the centrifugal force. Let us note that the pivoting between the frame and the axle around this horizontal longitudinal axis can be carried out independently of the suspension, for example. In fact, it goes without saying one would not leave the fields of protection of invention by producing a four-wheeled vehicle rather than a vehicle of the three-wheeled type such as illustrated FIGS. 1 to 5.

The drive unit 14 is located at the back of the vehicle close to the aft wheels 15 in the rear wheel drive embodiment. The drive unit can advantageously be equipped with a transmission. Moreover, the chassis can be tubular and be fabricated similar to that of a car. It goes without saying the steering wheels 4a, 4b of the steering carriage 4 could also be the driving wheels of the vehicle, without leaving the field of protection of invention.

According to an alternative embodiment, the steering assembly is at the back of the vehicle and its pivoting shaft is inclined to the top and backwards. The drive unit may then drive the front wheels of the vehicle.

According to another alternative, the vehicle presents two sets of steering assemblies which cooperate to guide the vehicle, one steering assembly in the front and one a steering assembly in the rear. Each one of the aforesaid steering assemblies are of the type that were described in the preferred embodiment of the vehicle of the invention. Thus, the pivoting shafts of front and back can be inclined respectively upwards and forward in one and upwards and rearward in the other. The means of inclination and the control means associated with the front and back pivoting shafts make it possible to interrelate the pivoting of the aforesaid pivoting shafts, the slope of the front being closely related to the slope of the back. Both are adjusted according to the speed of the vehicle which is the primary technical parameter to determine the angles of inclination of the front and back assemblies. Thus, the operation of the respective inclination means of the front and back steering carriages can be carried out in a synchronous way or an asynchronous or opposite way for example.

It goes without saying that rotating the pivoting shafts around their transverse axis of rotation is carried out in a continuous and fixed way while the vehicle is moving so as to adapt the handling of the vehicle to its speed.

In addition, it is significant to note that the inclination of the pivoting shafts also affects the suspension of the steering carriage. This allows the modification of their behavior according to the angle of inclination A of the pivoting shaft and therefore the speed of vehicle when the pivoting shaft itself inclines towards the front, the steering carriage and its suspension incline also around the axis transverse YY' like is illustrated in FIGS. 2 and 4. One can thus adjust a rigidity of suspension of the vehicle.

According to alternative embodiment, the extendible cylinder which manages the inclination of the axis ZZ' can be replaced by any equivalent system like those using rods, cams or endless screws, for example, in order to allow the adjustment of the angle of inclination of the pivoting shaft 5.

Moreover, according to other alternatives, the connection between the pivoting shaft 5 and the steering column 7 is not obtained using a universal joint. The pivoting shaft can be free at its lower end and the transmission of turning force to the pivoting shaft carried out by means of cables or belts.

Of course, the invention is not limited to the modes of realization described and represented by way of examples, but is understood to also include all the equivalent techniques like their combinations.

The invention claimed is:

1. A vehicle comprising:
   a support chassis;
   a steering assembly the steering assembly including:
      at least two wheels; and
      a steering column;
   the steering assembly being articulately mounted to a carrying frame for articulation of a steering axis relative to a generally vertical plane, the steering axis being defined by an axis of rotation of a pivoting shaft of the steering assembly;
      an inclining means which controls a slope of the steering axis to incline the slope of the steering axis relative to the generally vertical plane, the inclining means inclines the pivoting shaft relative to the carrying frame around a transverse axis; and
      a control means for controlling the inclining means to select an angle of inclination of the steering axis relative to the vertical plane.

2. The vehicle according to claim 1 wherein the inclining means controls a slope of the steering axis between vertical and forward of vertical when the steering assembly is disposed at a front end of the carrying frame and between vertical and inclined rearward of vertical when the steering assembly is disposed at the back of the support chassis.

3. The vehicle according to claim 1 wherein the inclining means adjusts the angle of inclination of the steering axis while the vehicle is moving.

4. The vehicle according to claim 1 wherein the control means includes a means for determining an optimum angle of inclination of the steering axis according to at least one of the vehicle and its environment.

5. A vehicle comprising a chassis and a steering assembly, the steering assembly comprising:
   at least two wheels;
   a pivoting shaft which defines an axis of rotation centrally therethrough;
   an inclining means which controls a slope of the axis of rotation, the inclining means inclining a return bearing and the pivoting shaft, which return bearing is carried by a control arm and rotatably mounted on the carrying frame for rotation around a transverse axis of rotation.

6. The vehicle according to claim 5 wherein the inclining means includes an extensible cylinder positioned between the chassis and one of the control arm and the return bearing.

7. A vehicle including:
- a chassis;
- a steering assembly including at least two wheels and a pivoting shaft, the steering assembly articulatingly mounted to the chassis such that an axis of rotation of the pivoting element shaft can be inclined relative to a vertical plane;
- an inclining means which controls a slope of the axis of rotation, the inclining means includes an articulation which permits inclining of the pivoting shaft relative to the chassis around a transverse axis;
- a steering means which controls rotation of a steering column articulated to the pivoting shaft by an articulation to transmit a rotational steering motion to the pivoting shaft.

8. A vehicle comprising:
- a chassis;
- a steering assembly the steering assembly including:
  - at least two wheels; and
  - a steering column;
- the steering assembly being articulately mounted to the chassis for rotation of a steering axis relative to a generally vertical plane;
- an inclining means which inclines the steering axis relative to the generally vertical plane;
- an optimum angle determining means for determining an optmal angle of inclination of the steering axis according to a speed of vehicle, the angle of inclination increasing as the speed of the vehicle increases;
- a control means for controlling the inclining means to incline the steering axis to the determined optimal angle.

* * * * *